US008484555B2

(12) United States Patent
Fukasawa

(10) Patent No.: US 8,484,555 B2
(45) Date of Patent: Jul. 9, 2013

(54) ELECTRONIC DOCUMENT CONTROL APPARATUS, METHOD, PROGRAM AND SYSTEM

(75) Inventor: Yusuke Fukasawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 557 days.

(21) Appl. No.: 12/865,530

(22) PCT Filed: Apr. 20, 2009

(86) PCT No.: PCT/JP2009/058218
§ 371 (c)(1),
(2), (4) Date: Jul. 30, 2010

(87) PCT Pub. No.: WO2009/142096
PCT Pub. Date: Nov. 26, 2009

(65) Prior Publication Data
US 2010/0313117 A1   Dec. 9, 2010

(30) Foreign Application Priority Data

Apr. 24, 2008   (JP) ................................. 2008-114420

(51) Int. Cl.
*G06F 17/00*   (2006.01)
(52) U.S. Cl.
USPC ........................... 715/243; 715/253; 713/176
(58) Field of Classification Search
USPC ................... 715/234–239, 243, 253; 713/176
See application file for complete search history.

(56) References Cited

U.S. PATENT DOCUMENTS

| 7,552,335 | B2 | 6/2009 | Iawamura | |
| 2004/0107348 | A1* | 6/2004 | Iwamura | 713/176 |
| 2004/0230891 | A1* | 11/2004 | Pravetz et al. | 715/511 |
| 2006/0265330 | A1 | 11/2006 | Fukasawa | |
| 2007/0055885 | A1* | 3/2007 | Yamazaki et al. | 713/176 |
| 2008/0082829 | A1 | 4/2008 | Yoshioka et al. | |

FOREIGN PATENT DOCUMENTS

| JP | 2001-167086 | 6/2001 |
| JP | 2004-180278 | 6/2004 |
| JP | 2005-285020 | 10/2005 |

OTHER PUBLICATIONS

Written Opinion of the International Searching Authority, dated May 27, 2009, issued in International Application No. PCT/JP2009/058218.

\* cited by examiner

*Primary Examiner* — Adam M Queler
*Assistant Examiner* — Howard Cortes
(74) *Attorney, Agent, or Firm* — Fitzpatrick, Cella, Harper & Scinto

(57) ABSTRACT

An electronic document control apparatus verifies that content to which a digital signature has been applied has not been altered; verifies that a referential target of a new page is a signature area to which a digital signature has been applied; if the electronic document has been imparted with a policy for permitting page layout, verifies that the referential target of a new page does not include anything other than the content to which the digital signature has been applied, and if the electronic document has been imparted with a policy for permitting page layout and background rendering of content, verifies that the referential target does not include anything other than the content and a background object of the content; and determines by using at least one of the first, second and third verification means, whether or not the edited electronic document has been altered.

7 Claims, 13 Drawing Sheets

US 8,484,555 B2

ELECTRONIC DOCUMENT CONTROL APPARATUS, METHOD, PROGRAM AND SYSTEM

This is a U.S. National Phase of PCT/JP2009/058218, internationally filed on Apr. 20, 2009.

TECHNICAL FIELD

1. Field of the Invention

The present invention relates to an electronic document control apparatus, method and program for editing an electronic document created by a preparer, and to a system that includes this apparatus.

2. Background Art

Often an electronic document (original) created by a preparer is subjected to an operation such as editing by another user. For example, another user subjects an original electronic document to editing so as to change the layout to a "4-in-1" layout, etc. Such editing is performed in accordance with a security policy such as access privilege given to the electronic document (i.e., the original) by the preparer. As a result, unauthorized access to the electronic circuit by an indefinite number of users can be prevented and the originality of the electronic circuit can be assured.

Various techniques have been developed in order to change the data in an electronic document while the originality of the data is assured. The specification of Japanese Patent Laid-Open No. 2004-180278 describes an information processing apparatus having holding means which, when original data is changed, holds change data relating to this change, and change assurance information creating means which creates change assurance information for assuring that the change information is the original. In accordance with this information processing apparatus, it is determined whether the change of the original data is authorized. It is described that if the change is found to be authorized, then the original data can be changed by the change information.

Conventionally, in a case where a user wishes to edit only the layout of an electronic document without changing the information that is the content of the document, it is required that the preparer visually verify the content of the electronic document whose content has been edited and give approval as by a digital signature or the like.

There are many cases where the existence of multiple preparers is taken into account, a server for managing security policy and the like is set up and the server is connected to multiple client terminals to thereby construct an electronic document control system. If the number of users increases and the system becomes one of large scale, the network may become increasingly diversified and the environment may not be one in which users and preparers can communicate directly. However, the necessity of the system is premised upon an environment in which users and preparers can communicate, although this is not necessarily realized depending upon the particular electronic document control system. Accordingly, it is necessary to construct an environment which takes into account the fact that approval of the preparer in regard to edited content is obtained when a user edits the electronic document created by the preparer.

DISCLOSURE OF INVENTION

The present invention provides an electronic document control apparatus capable of enhancing convenience when a user edits an electronic document.

The present invention in its first aspect provides an electronic document control apparatus for editing an electronic document, which has been imparted with a policy for permitting page layout or for permitting background rendering of content in addition to page layout, and in which a digital signature has been applied to the content, the apparatus comprising: a first verification unit configured to verify that the content to which the digital signature has been applied has not been altered; a second verification unit configured to verify that a referential target of a new page generated afresh in editing of the electronic document is a signature area to which a digital signature has been applied; a third verification unit configured to, if the electronic document has been imparted with a policy for permitting page layout, verify that the referential target of a new page generated afresh in editing of the electronic document does not include anything other than the content to which the digital signature has been applied, and if the electronic document has been imparted with a policy for permitting page layout and background rendering of content, verify that the referential target of a new page generated afresh in editing of the electronic document does not include anything other than the content and a background object of the content; and a determination unit configured to determine, by using at least one of the first, second and third verification units, whether the edited electronic document has been altered.

Further, the present invention in its second aspect provides an electronic document control method executed in an electronic document control apparatus for editing an electronic document, which has been imparted with a policy for permitting page layout or for permitting background rendering of content in addition to page layout, and in which a digital signature has been applied to the content, the method comprising: a first verification step of verifying that the content to which the digital signature has been applied has not been altered; a second verification step of verifying that a referential target of a new page generated afresh in editing of the electronic document is a signature area to which a digital signature has been applied; a third verification step of verifying that the referential target of a new page generated afresh in editing of the electronic document does not include anything other than the content to which the digital signature has been applied if the electronic document has been imparted with a policy for permitting page layout, and verifying that the referential target of a new page generated afresh in editing of the electronic document does not include anything other than the content and a background object of the content if the electronic document has been imparted with a policy for permitting page layout and background rendering of content; and a determination step of determining, by using at least one of the first, second and third verification steps, whether the edited electronic document has been altered.

Further, the present invention in its third aspect provides an electronic document control system including a terminal device for creating an electronic document, an electronic document control apparatus for editing a created electronic document, and a server for controlling a policy imparted to the electronic document, the terminal device and electronic document control apparatus being connected via the server and a network, wherein the terminal device and server include: an imparting unit configured to impart the electronic document with a policy for permitting page layout or for permitting background rendering of content in addition to page layout; and a signature unit configured to apply a digital signature to content in the electronic document to which the policy has been imparted by the imparting unit; and the electronic document control apparatus includes: a first verification unit for verifying that the content to which the digital signature has been applied has not been altered; a second verification unit configured to verify that a referential target of a new page generated afresh in editing of the electronic document is a signature area to which a digital signature has been applied; a third verification unit configured to, if the electronic document has been imparted with a policy for permitting page layout, verify that the referential target of a new page generated afresh in editing of the electronic document does not include anything other than the content to which the digital signature has been applied, and if the electronic document has been imparted with a policy for permitting page layout and background rendering of content, verify that the referential target of a new page generated afresh in editing of the electronic document does not include anything other than the content and a background object of the content; and a determination unit for determining, by using at least one of the first, second and third verification units, whether the edited electronic document has been altered.

Further, the present invention in its fourth aspect provides an electronic document control apparatus comprising: a layout changing unit configured to change page layout of an electronic document; a detection unit configured to detect a content change in a content contained in the electronic document; and a determination unit configured to judge whether the detection unit has detected a content change in the content in a case where page layout has been changed by the layout changing unit; wherein a change in a page layout by the layout changing unit is permitted if result of the determination by the determination unit is that there has be no content change in the content; and a change in page layout by the layout changing unit is not permitted if result of the determination by the determination unit is that there has been a content change in the content.

Further, the present invention in its fifth aspect provides a method of controlling an electronic document, comprising a changing step of changing a page layout of an electronic document; a detecting step of detecting a content change in a content contained in the electronic document; and a judging step of judging whether a content change in the content has been detected in a case where page layout has been changed; wherein a change in page layout is permitted if result of the determination is that there has be no content change in the content; and a change in page layout is not permitted if result of the determination is that there has been a content change in the content.

In accordance with the present invention, it is possible to enhance convenience when a user edits an electronic document.

Further features of the present invention will become apparent from the following description of exemplary embodiments with reference to the attached drawings.

BEST MODE FOR CARRYING OUT THE INVENTION

Figure 1:
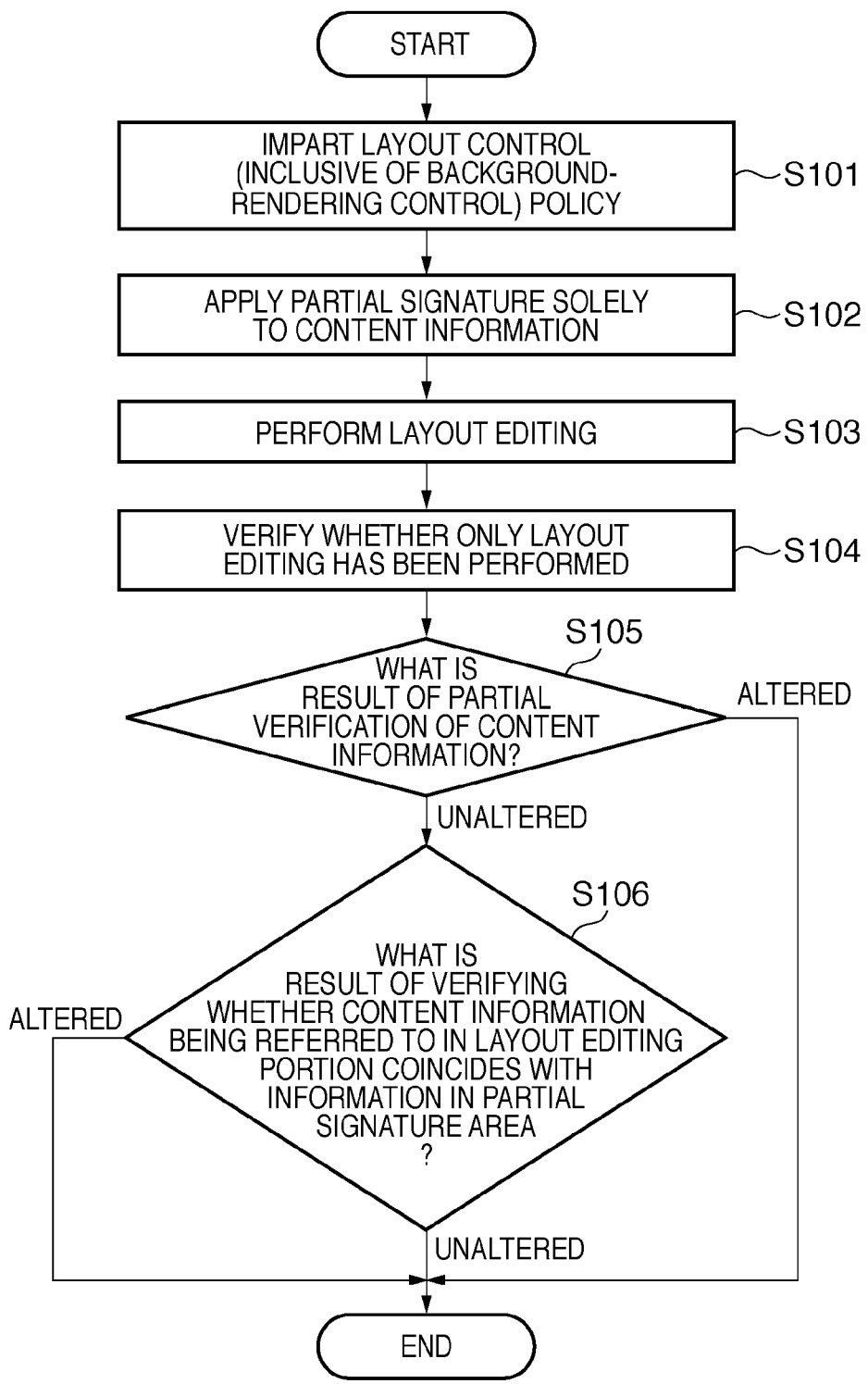
FIG. 1 is a flowchart illustrating an overview of processing executed by an electronic document control system that includes an electronic document control apparatus according to an embodiment of the present invention.

A preferred embodiment of the present invention will now be described in detail with reference to the drawings. It should be noted that identical structural elements are identified by like reference characters.

<Overview>

Figure 3:
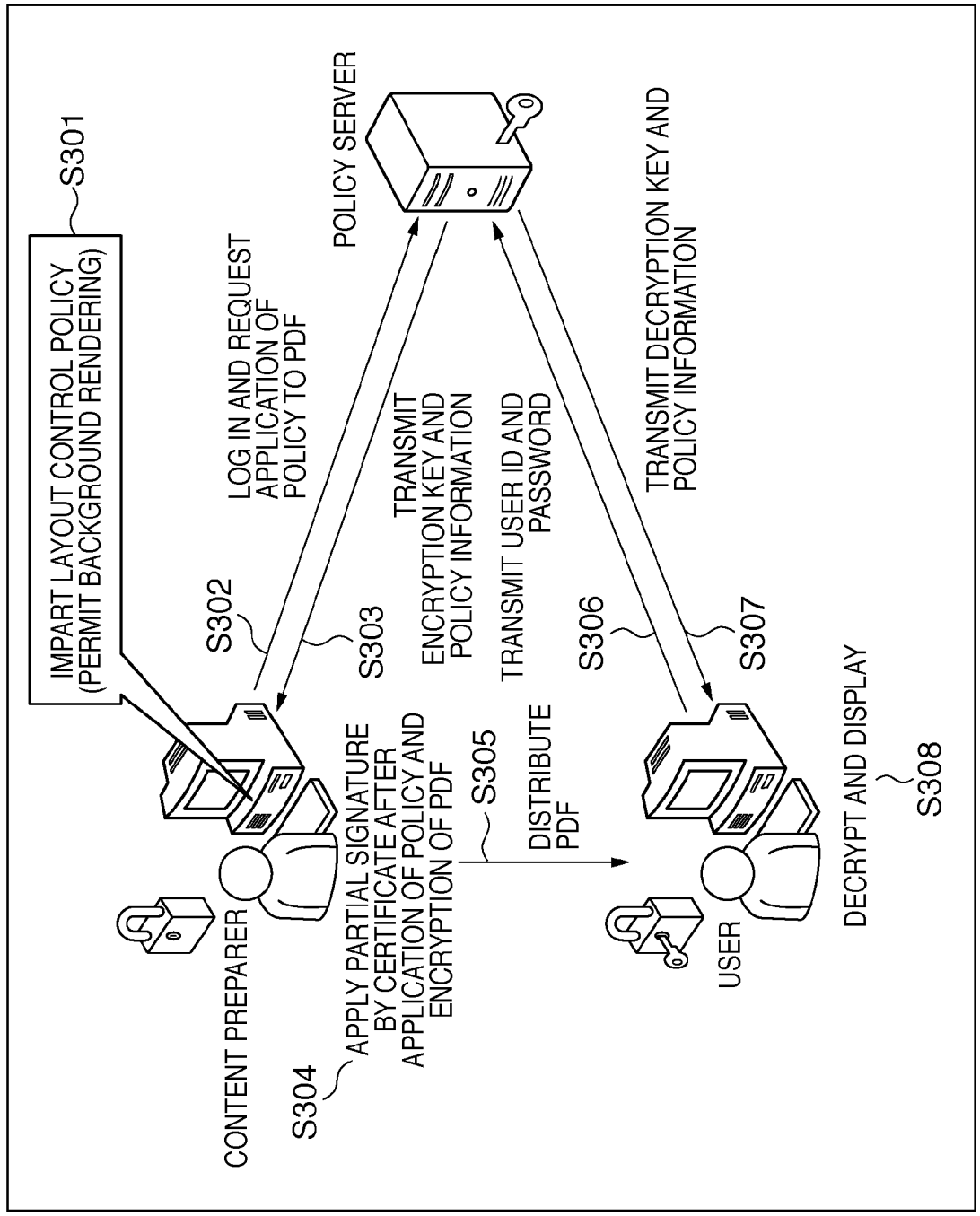
FIG. 3 is a diagram illustrating an overview of an electronic document control system in this embodiment.

FIG. 1 is a flowchart illustrating an overview of processing executed by an electronic document control system that includes an electronic document control apparatus according to an embodiment of the present invention. The flowchart shown in FIG. 1 is executed in an electronic document control system shown in FIG. 3 and including a terminal used by a preparer of an electronic document, a terminal used by a user and a policy server for controlling policy imparted to an electronic document. FIG. 3 will be described later.

First, at step S101 in FIG. 1, the preparer uses his own terminal to impart an electronic document with a policy for layout control (inclusive of control of background rendering) while communicating with the policy server. The electronic document is a PDF (Portable Document Format) file, by way of example. At step S102, the preparer, using the terminal, applies a digital signature (referred to simply as a "signature" below) solely to content information desired to be protected. Such signature processing will be referred to as a "partial signature" below.

Next, at step S103, the user uses his terminal to edit an electronic document created and provided with a partial signature by the preparer. In this embodiment, a created electronic document is subjected to a page layout that includes a "2-in-1" page layout. Page layout (layout processing) in this embodiment includes not only the allocation of pages but also imposition and layout arrangement of content in PDF data created by the preparer.

From step S104 onward, whether only a layout change has been made with no alteration of content information is verified, and it is determined based upon the result of verification whether the electronic document has or has not been altered. First, at step S105, the content information to which the partial signature has been applied is verified (i.e., subjected to partial verification). If it is determined at this stage that the content information has not been altered, control proceeds to step S106. If alteration is determined, on the other hand, then this processing is exited based upon this result.

At step S106, whether content information being referred to in the layout editing portion coincides with information in a partial signature area is verified. If it is determined that the two coincide, then it is determined that only layout editing has been performed and not alteration of content information. This processing is then exited based upon this result. If it is determined that the two do not coincide, then it is determined that content information has been altered. This processing is then exited based upon this result.

In the processing set forth above, a PDF file is described as the electronic document. However, as long as the electronic document is one having a hierarchical data structure and each of the structural elements is joined by reference information, then any document format will suffice. For example, use may be made of a structured electronic document such as XPS (XML Paper Specification) or SVG (Scaleable Vector Graphic).

<Overall Flow>

Figure 2:
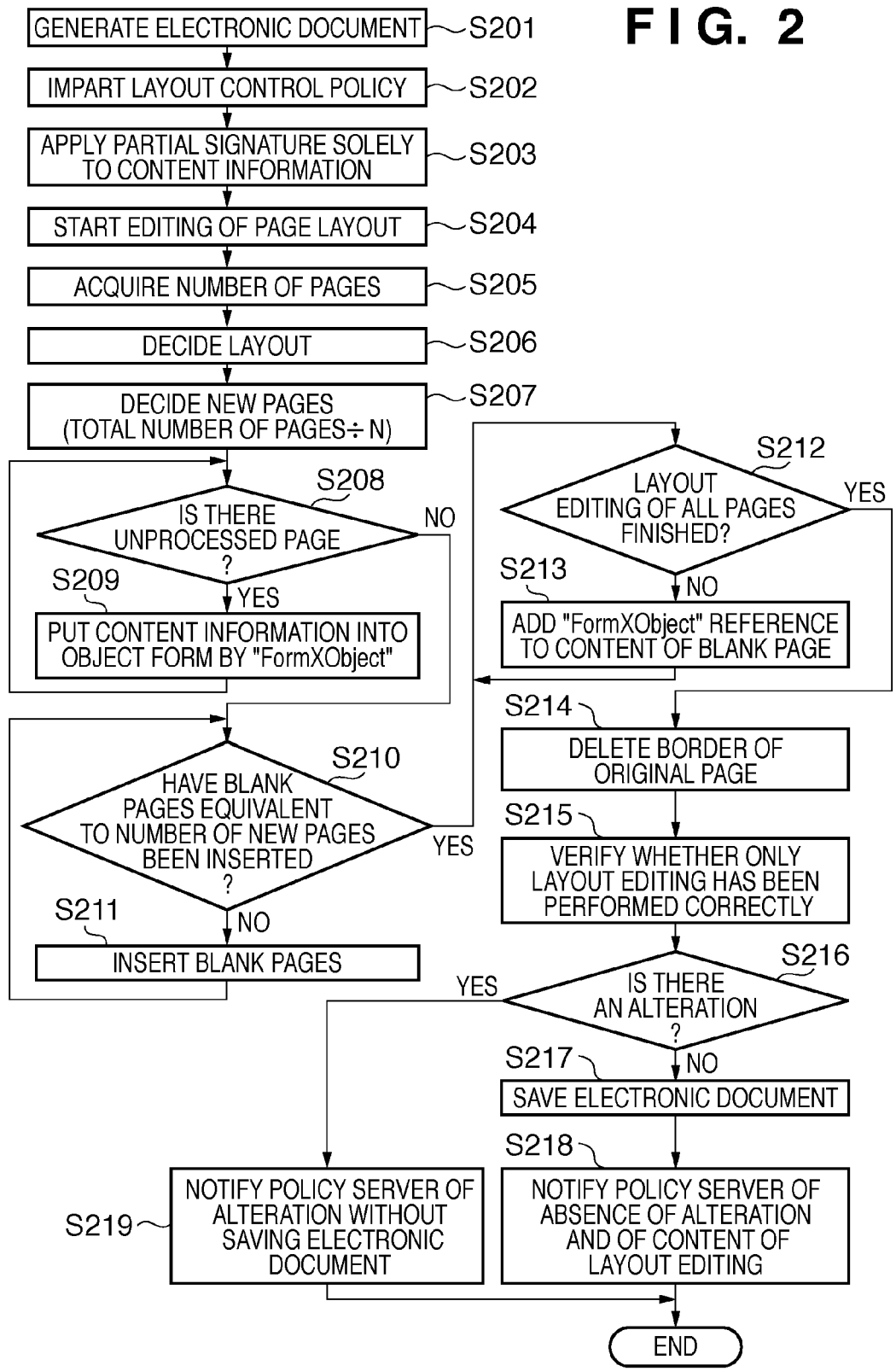
FIG. 2 is a flowchart illustrating in greater detail the processing executed by an electronic document control system in this embodiment.

The flowchart of FIG. 1 will now be described in greater detail with reference to FIG. 2. FIG. 2 is a flowchart illustrating in greater detail the processing executed by an electronic document control system in this embodiment.

First, at step S201, the preparer generates an electronic document at his own terminal. The generated electronic document is the original in the electronic document control system. At step S202, the terminal of the preparer communicates with the policy server, etc., and imparts the electronic document with a layout-control policy. At step S203, using his own terminal, the preparer applies a partial signature solely to the content information.

Next, at step S204, the user acquires the electronic document created by the preparer and, using an electronic document editing application, etc., at his own terminal, starts page-layout processing with respect to the partially signatured electronic document. Processing from this point onward is executed in the terminal of the user. By controlling peripheral blocks using a CPU within the terminal, each processing step is executed.

First, at step S205, the total number of pages of the electronic document is acquired. At step S206, what the final layout is to be is decided. For example, an ordinary N-in-1 layout is decided. This decision may be made by the user or it may be predetermined. Further, complicated layout processing that differs for every page may also be executed.

At step S207, the final number of new pages after layout editing is decided. In this embodiment, the number of new pages is decided by "total number of pages÷N". For example, if the total number of pages is 100 and the "N" of "N in 1" is "4", then the number of new pages in the layout generated anew will be 25.

Figure 11:
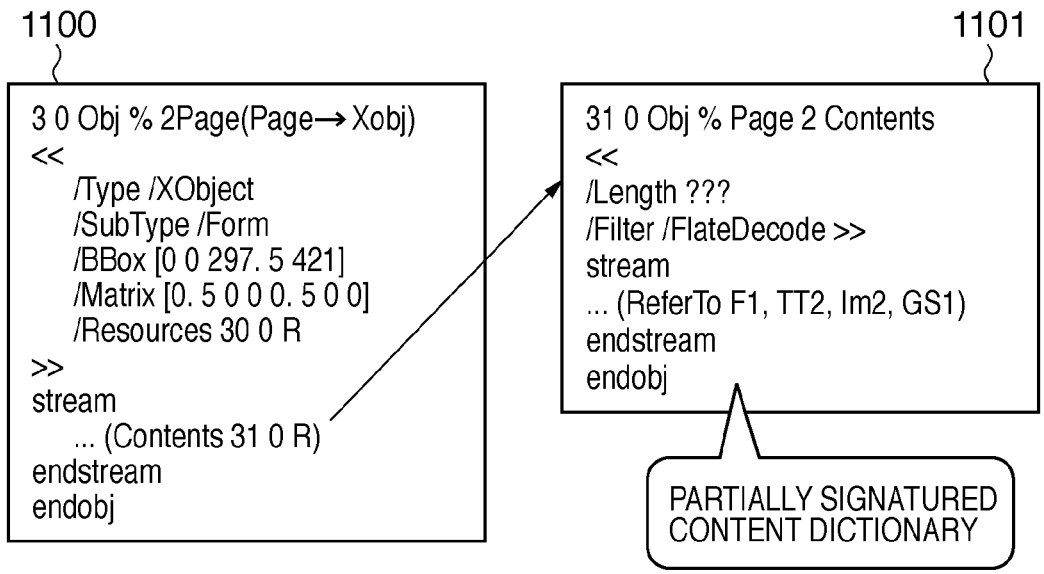
FIG. 11 is a diagram illustrating an example of dictionary in which content information has been put into the form of a FormXObject.

At step S208, whether a page not yet processed at step S209 exists or not is determined. If it is determined that a page not yet processed at step S209 exists, then control proceeds to step S209. On the other hand, if it is determined that all pages have been processed, then control proceeds to step S210. Content information to which each page refers to is converted to an object at step S209. In general, various methods are used in a structured document to perform the object conversion. In a case where the electronic document is a PDF file, for example, the conversion to the object is performed by enclosure within a container referred to as a "FormXObject". An example of data structure put into the form of an object by "FormXObject" is shown in FIG. 11.

At step S210, it is determined whether blank pages, the number of which is the number of new pages after layout editing, have been inserted at the end of the electronic document. If it is determined that blank pages the number of which is the number of new pages have not yet been inserted into the electronic document, then blank pages are inserted into the electronic document in a number equivalent to the number of new pages at step S211. On the other hand, if it is determined that blank pages the number of which is the number of new pages have been inserted into the electronic document, then control proceeds to step S212.

At step S212, it is determined whether the content of all inserted blank pages has been subjected to the processing of step S213. If it is determined that a page not yet subjected to this processing exists, control proceeds to step S213. On the other hand, if it is determined that the content of all blank pages has been subjected to the processing of step S213, then control proceeds to step S214. Layout editing of pages is performed at step S213. Specifically, in the case of 2-in-1, a "FormXObject" is placed in the content of an inserted blank page in such a manner that reference will be made to the content information of the original page 1 and page 2. At step S214, the borders of the original pages are deleted but not the content information of the original pages. For example, in the case of PDF, the border of an original page is deleted by deleting the reference information of the original page from a "Pages" dictionary, which is the parent dictionary. Page layout editing of the electronic document is executed in the manner set forth above.

Next, at step S215, whether only layout editing has been performed correctly (i.e., whether there has been no alteration of the content information of the electronic document as a result of layout editing) is verified. The details of the processing at step S215 will be described later. If is determined at step S216 as a result of the verification at step S215 that the content information has been altered, then control proceeds to step S219, the electronic document is not saved, the policy server is notified of the fact that alteration has occurred and this processing is then exited. On the other hand, if it is determined that alteration has not taken place, then control proceeds to step S217, where the layout-edited electronic document is saved. Then, at step S218, the policy server is notified of the fact that there is no alteration and of the content of layout editing and this processing is then exited.

<Flow from Imparting of Layout Control Policy to Display of Electronic Document by User>

The processing at step S202 of FIG. 2 will now be described in detail with reference to FIG. 3. As shown in FIG. 3, the electronic document control system of this embodiment includes the terminal of the preparer of an electronic document, the terminal employed by the user who edits the electronic document created by the preparer, and the policy server for imparting the electronic document with the security policy. The terminals shown in FIG. 3 are connected to the policy server via a network. The policy server is used to control (manage) the privilege (policy such as the access privilege) that has been set regarding an electronic document such as a PDF file. For example, assume that whether or not a certain electronic document is allowed to be changed or printed has been set on a per-user basis. If the preparer wishes to change the privilege regarding this electronic document to whether a change or printing is allowed or not on a per-group basis, the preparer can change the privilege dynamically by communicating with the policy server. Such a change can also be made after the electronic document as already been distributed to the user. Further, each terminal is equipped with an electronic document editing application so that processing such as editing can be applied to electronic documents.

Figure 14:
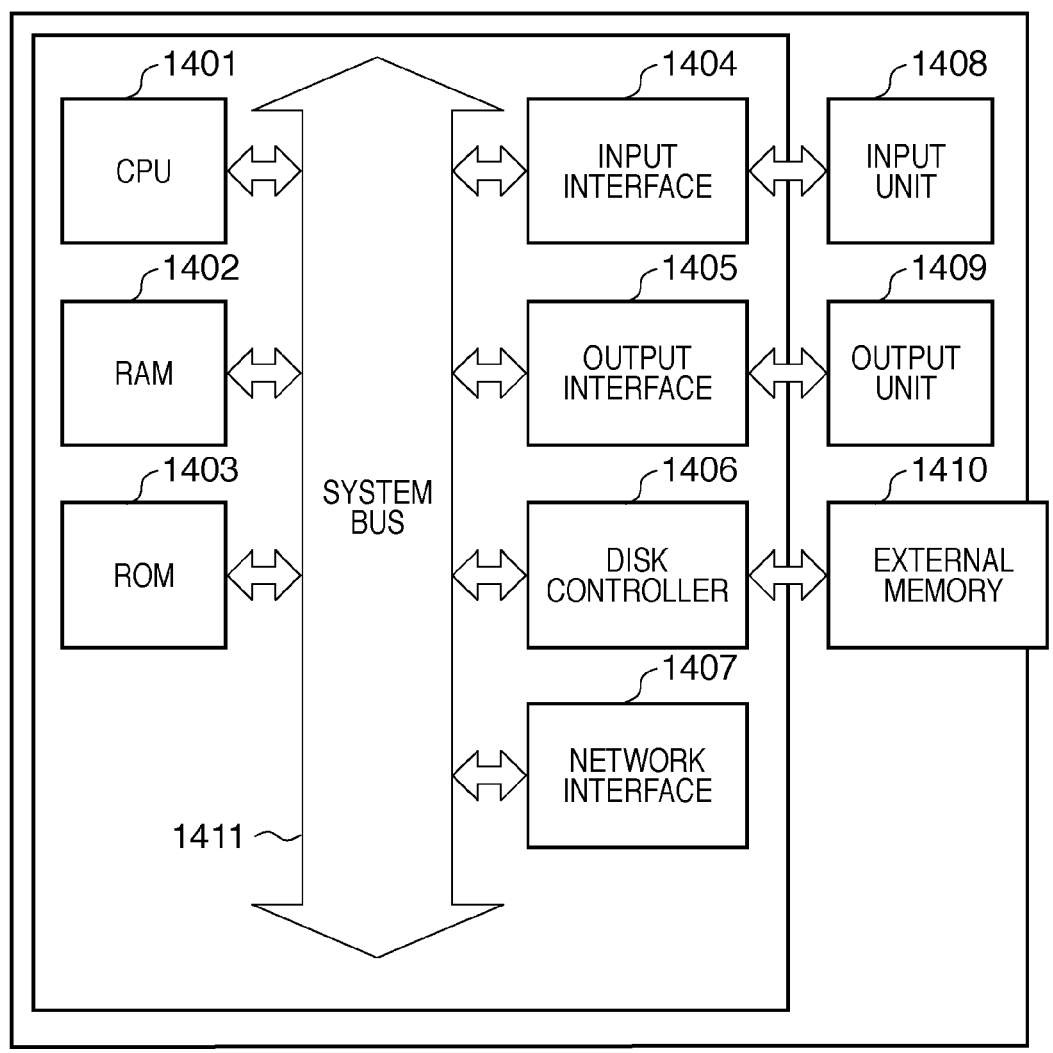
FIG. 14 is a diagram illustrating an example of the configuration of an information processing apparatus applied to a terminal used by a preparer or user and to the policy server shown in FIG. 3.

FIG. 14 is a diagram illustrating an example of the configuration of an information processing apparatus applied to a terminal used by a preparer or user and to the policy server shown in FIG. 3. As shown in FIG. 14, the information processing apparatus is equipped with a CPU 1401 which, based upon a program and the like stored in a ROM or external memory, executes processing of a document that is a mixture of figures, images, text and tables (inclusive of spreadsheets, etc.), by way of example. The CPU exercises overall control of various blocks connected to a system bus.

An operating system program, which is the control program of the CPU, has been stored in a ROM 1403 or external memory 1410. Various data conforming to processing has been stored in the ROM or external memory.

A RAM 1402 functions as the main memory or work area, etc., of the CPU 1401. An input interface 1404 controls inputs from an input unit 1408 such as a keyboard and mouse. An output interface 1405 controls a display presented on an output unit 1409 such as a CRT display. A disk controller 1406 controls access to an external memory 1410 storing a booting program, various applications, user files and an edit file, etc. The external memory 1410 employs a hard disk, etc. A network interface 1407 is connected to a network such as a LAN and can communicate with another apparatus. The various components mentioned above are interconnected by a system bus 1411.

FIG. 3 is a diagram useful in describing flow from imparting of layout control policy by the preparer to display of an electronic document to the user. First, at step S301, after the preparer has created an electronic document, the preparer uses the electronic document editing application to set the fact that the electronic document is to be imparted with a policy for controlling layout. In this case, if necessary, the preparer may also set a subsidiary policy to the effect that background rendering is allowed. At step S302, using the electronic document editing application and entering the preparer's own ID and password, the preparer logs in to the policy server, which imparts the policy, and requests the server to impart the electronic document with the layout control policy. At step S303, after receiving the request, the policy server sends an encryption key and policy information back to the electronic document editing application.

At step S304, the electronic document editing application imparts the electronic document with the policy by means of the policy information and encrypts the electronic document by the encryption key. The electronic document editing application then subjects the electronic document to partial-signature processing (described later) using a preparer certificate. At step S305, the electronic document imparted with the layout control policy is distributed to the user. Distribution may be performed by e-mail or by the Web using a network or may be carried out by a medium such as a USB memory, CD-ROM or DVD-ROM without relying upon a network.

At step S306, the user who has acquired the electronic document imparted with the layout control policy sends the policy server his own ID and password. At step S307, after receiving the user's ID and password, the policy server executes processing for authenticating that the user is the user intended by the preparer. If this can be authenticated, then the policy server sends a decryption key and policy information back to the electronic document editing application.

At step S308, the electronic document editing application decrypts the encrypted electronic document based upon the decryption key and policy information and displays the electronic document. Further, the user is capable of performing an operation that is based upon the policy information.

<Method of Applying Partial Signature Solely to Content Information>

Figure 4:
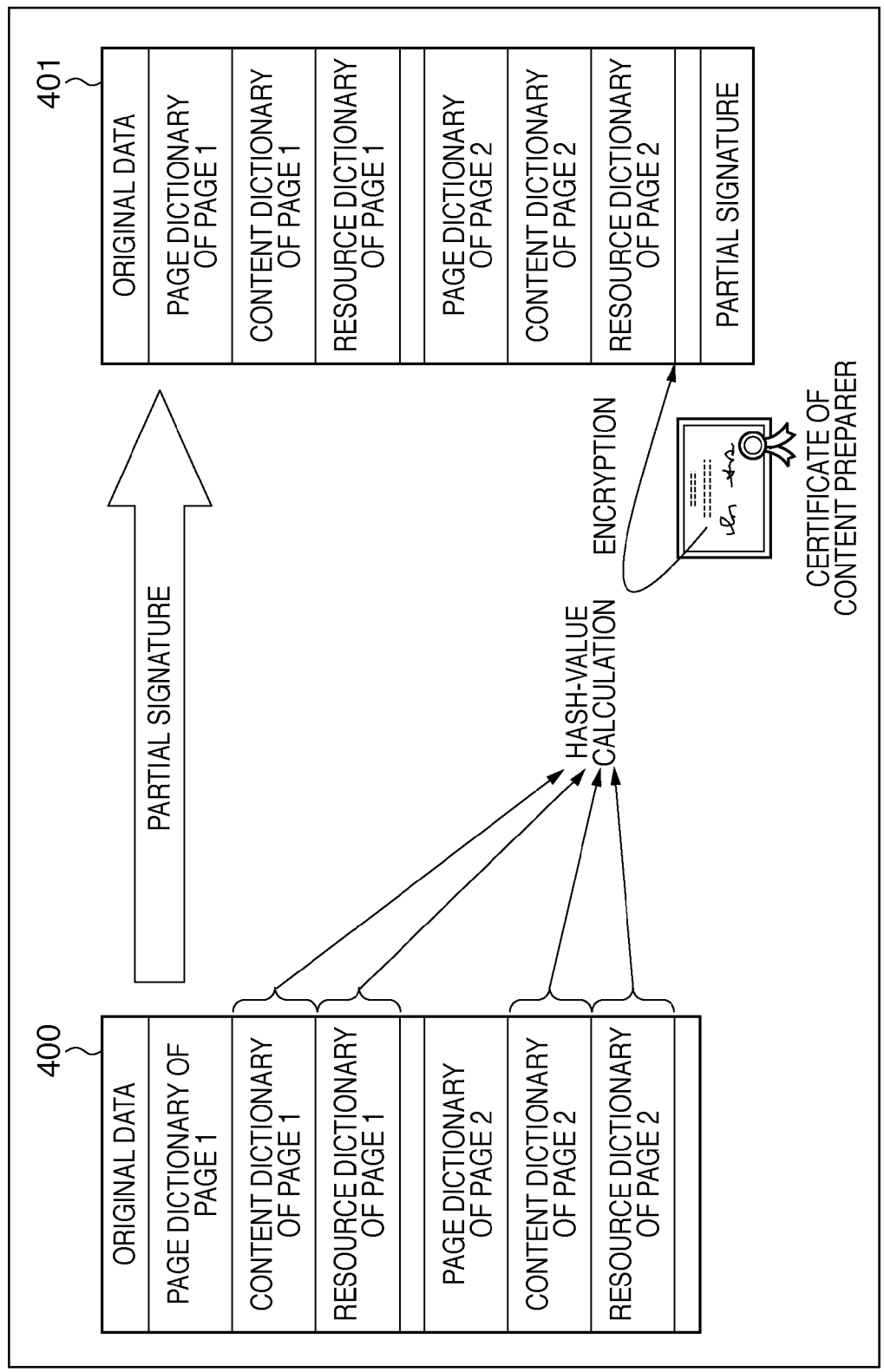
FIG. 4 is a diagram illustrating the composition of an electronic document before and after application of a partial signature to content information of the electronic document by a preparer.
Figure 5:
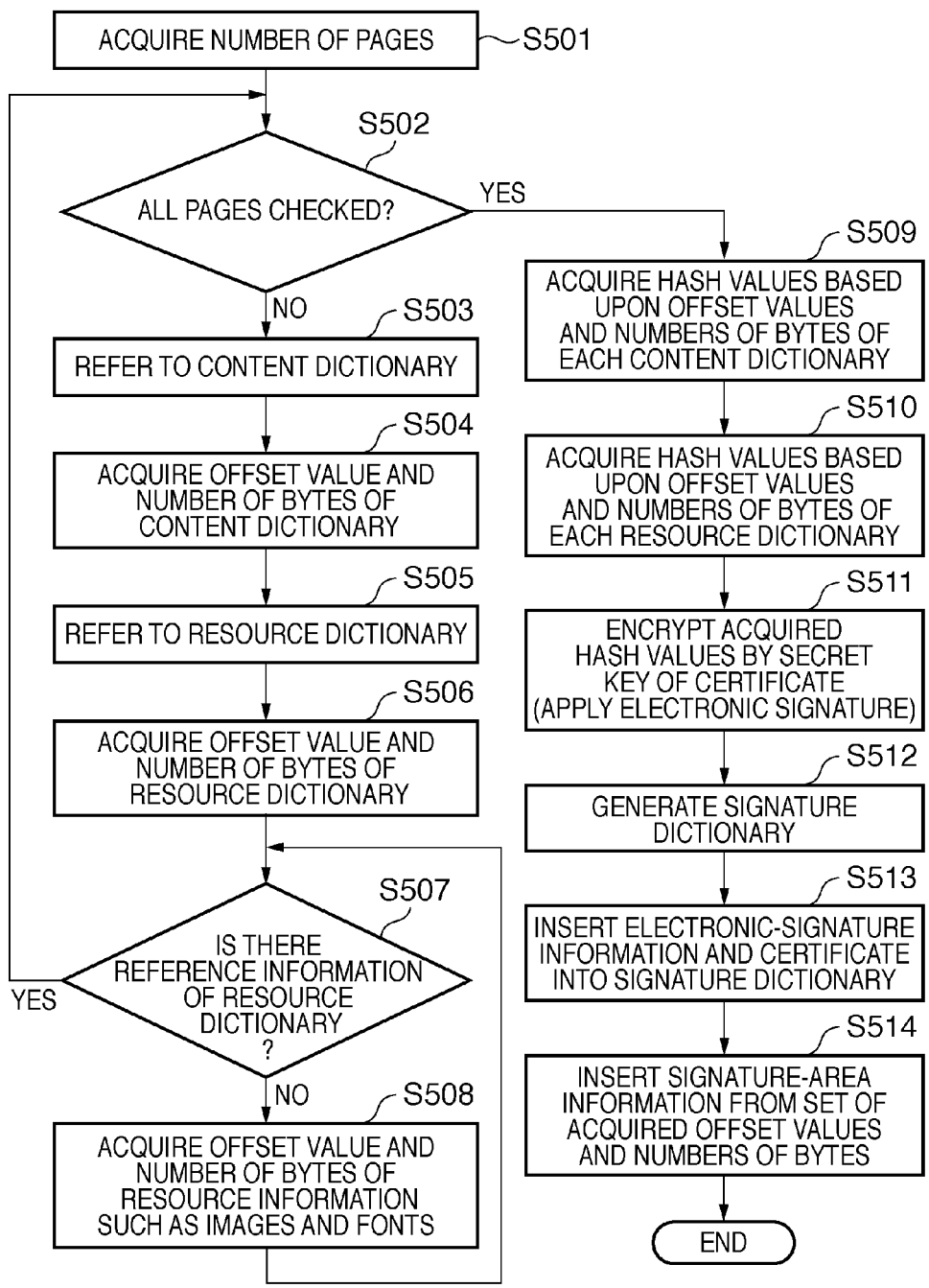
FIG. 5 is a flowchart illustrating processing whereby a preparer applies a partial signature solely to content information of an electronic document.

The details of the processing (partial signature) at step S203 in FIG. 2 will now be described while referring to FIGS. 4 and 5. FIG. 4 is a diagram illustrating the composition of an electronic document before and after application of a partial signature to content information of the electronic document by a preparer, and FIG. 5 is a flowchart illustrating processing whereby a preparer applies a partial signature solely to content information of the electronic document.

An electronic document 400 shown in FIG. 4 indicates the internal structure of an electronic document before partial-signature processing is executed. The electronic document will be described as a PDF below. As shown in FIG. 4, the electronic document 400 contains a page dictionary, a content dictionary and a resource dictionary on a page-by-page basis. The page dictionary refers to the content dictionary, and the content dictionary refers to the resource dictionary. The content dictionary and resource dictionary will also be referred to collectively as "content information" below. Further, if the resource dictionary refers to other information as well, then it will be assumed that the information referred to also is contained in the content information.

In this embodiment, electronic-signature information is generated by calculating hash values with regard to the content information of all pages and encrypting the hash values using a secret key that forms a pair with a public key included in the certificate of the content preparer. The generated electronic-signature information, the certificate and the hash range are inserted at the end of the data of the electronic document as a signature dictionary, as indicated in an electronic document 401 (the electronic document that results after partial-signature processing is executed). Here the hash range indicates, in the form of an array, the offset values from the uppermost portion of the electronic document file and the numbers of bytes of the content dictionary and resource dictionary in each page. An example of a signature dictionary is described in FIG. 10.

Partial-signature processing will be described with reference to FIG. 5. First, at step S501, the total number of pages of the electronic document is acquired. At step S502, it is determined whether offset values and numbers of bytes of the content information referred to by the page dictionary have been acquired for all pages. If it is determined that these have been acquired for all pages, control proceeds to step S509. On the other hand, if it is determined that these have not been acquired for all pages, then control proceeds to step S503.

At step S503, reference is had to the content dictionary from the page dictionary. Generally, if an electronic document is a structured document in particular, it has been separated into the framework of pages corresponding to the page dictionary and the content information indicating the content of the document. Page framework, therefore, contains one or more items of content information. At step S504, the offset value and number of bytes from the beginning of the file of the electronic document are acquired with regard to the content dictionary to which reference is made. The acquired offset value and number of bytes are stored in memory temporarily.

At step S505, reference is made to the resource dictionary from the page dictionary. At step S506, the offset value and number of bytes from the beginning of the file of the electronic document are acquired with regard to the resource dictionary to which reference is made. The acquired offset value and number of bytes are stored in memory temporarily.

At step S507, it is determined whether information to which further reference is being made from the resource dictionary exists. If it is determined that information to which further reference is being made from the resource dictionary exists, control proceeds to step S508. At step S508, the offset value and number of bytes from the beginning of the file of the electronic document are acquired with regard to resource information such as images and fonts to which further reference is being made from the resource dictionary. The acquired offset value and number of bytes are stored in memory temporarily. Control returns to step S507 following the processing of step S508. On the other hand, if it is determined at step S507 that information to which further reference is being made from the resource dictionary does not exist, then control returns to step S502.

At step S509, hash values are acquired based upon the offset values and byte values of the content dictionaries stored temporarily in the memory at step S504. The acquired hash values are also stored in memory temporarily. At step S510, hash values are acquired based upon the offset values and byte values of the resource dictionaries stored temporarily in the memory at step S506. The acquired hash values are also stored in memory temporarily.

At step S511, the hash values stored in memory temporarily are encrypted by the secret key of the preparer of the electronic document and the electronic-signature information is generated.

At step S512, a signature dictionary is generated and, at step S513, the electronic-signature information and the certificate containing the public key of the preparer of the electronic document are inserted into the signature dictionary. At step S514, the offset values and numbers of bytes that have been stored temporarily in memory are inserted into the signature dictionary as information of a signature target area. The information of the signature target area indicates the hash range described in FIG. 4.

Processing of a partial signature in an electronic document by the preparer is performed as set forth above. The processing indicated at steps S512 to S514 is executed in such a manner that the signature is inserted at the end of the electronic document, as illustrated in FIG. 4. Such processing is referred to as "incremental save" in the case of a PDF file.

<Layout Editing by User>

Figure 6:
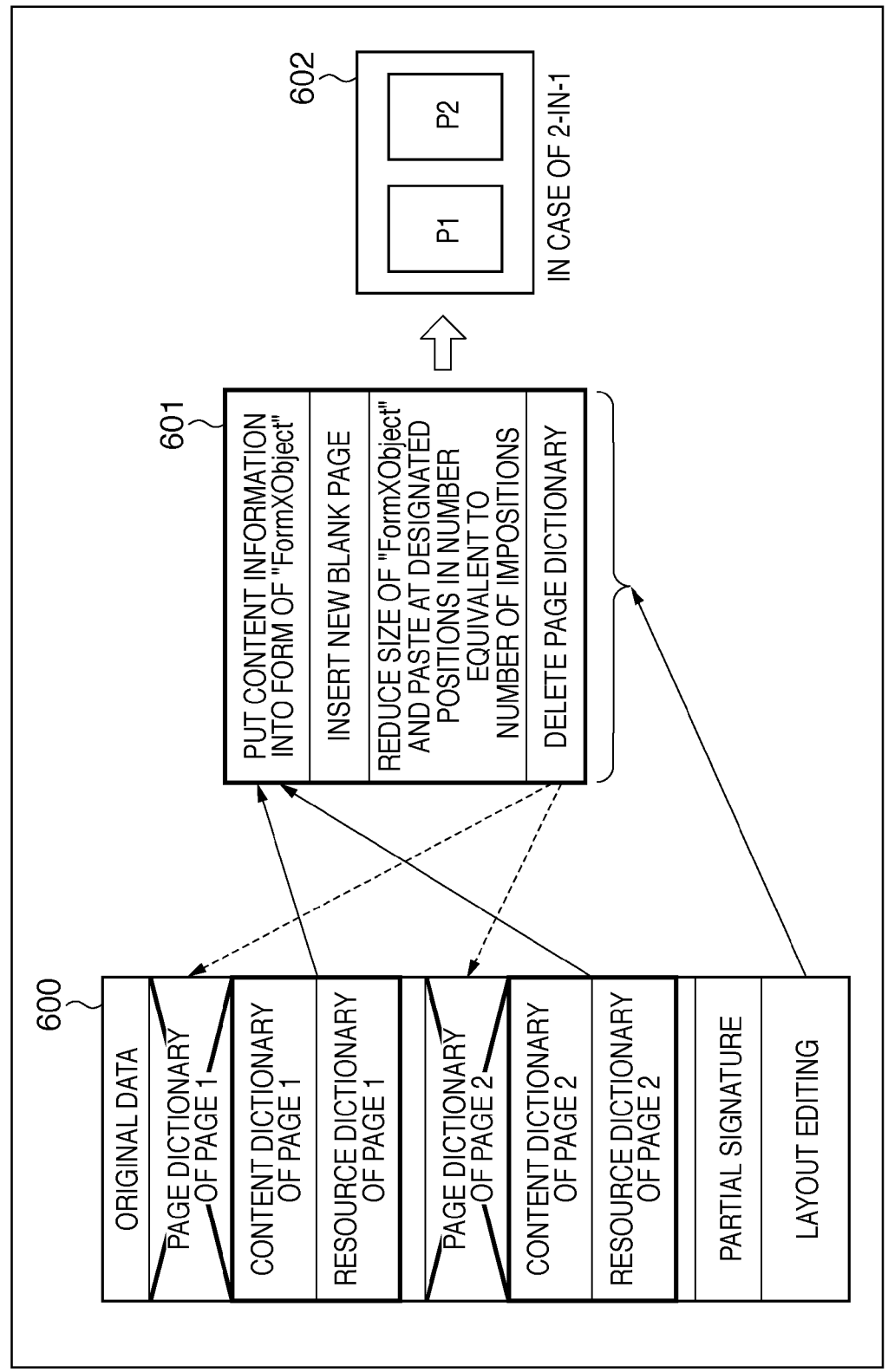
FIG. 6 is a diagram useful in describing the structure of an electronic document when a user has performed layout editing.

Described here will be the structure of an electronic document when a user acquires an electronic document, which has been imparted with a layout control policy and partially signatured, and has performed layout editing. FIG. 6 is a diagram useful in describing the structure of an electronic document when a user has performed layout editing.

An electronic document 600 illustrates the internal structure of electronic-document data after application of a partial signature to content information and execution of layout editing. As shown in FIG. 6, all information that has undergone layout editing has been incrementally saved at the end of the electronic document, as indicated by data 601. In this embodiment, what is described first as the layout editing content shown at data 601 is that the content information of electronic document 600 is wrapped using "FormXObject". This corresponds to the processing at step S209 in FIG. 2. This is followed by a description to the effect that a blank page is inserted anew and that "FormXObject" is reduced in size and pasted at designated positions in a number equivalent to the number of impositions. Here insertion of a blank page corresponds to step S211 of FIG. 2 and processing for performing pasting in a number equivalent to the number of impositions corresponds to step S213 in FIG. 2. Finally, it is described that the reference information of the page dictionaries is deleted. This corresponds to step S214 in FIG. 2. In actuality, the data of the page dictionaries is not deleted; rather, reference information by which the pages dictionary refers to the page information is deleted. The pages dictionary will be described below in conjunction with FIG. 7. An image 602 (FIG. 6) is an image diagram displayed to the user as a result of execution of layout editing. This indicates the display content of a new layout page in a case where a "2-in-1" imposition has been performed.

Figure 7:
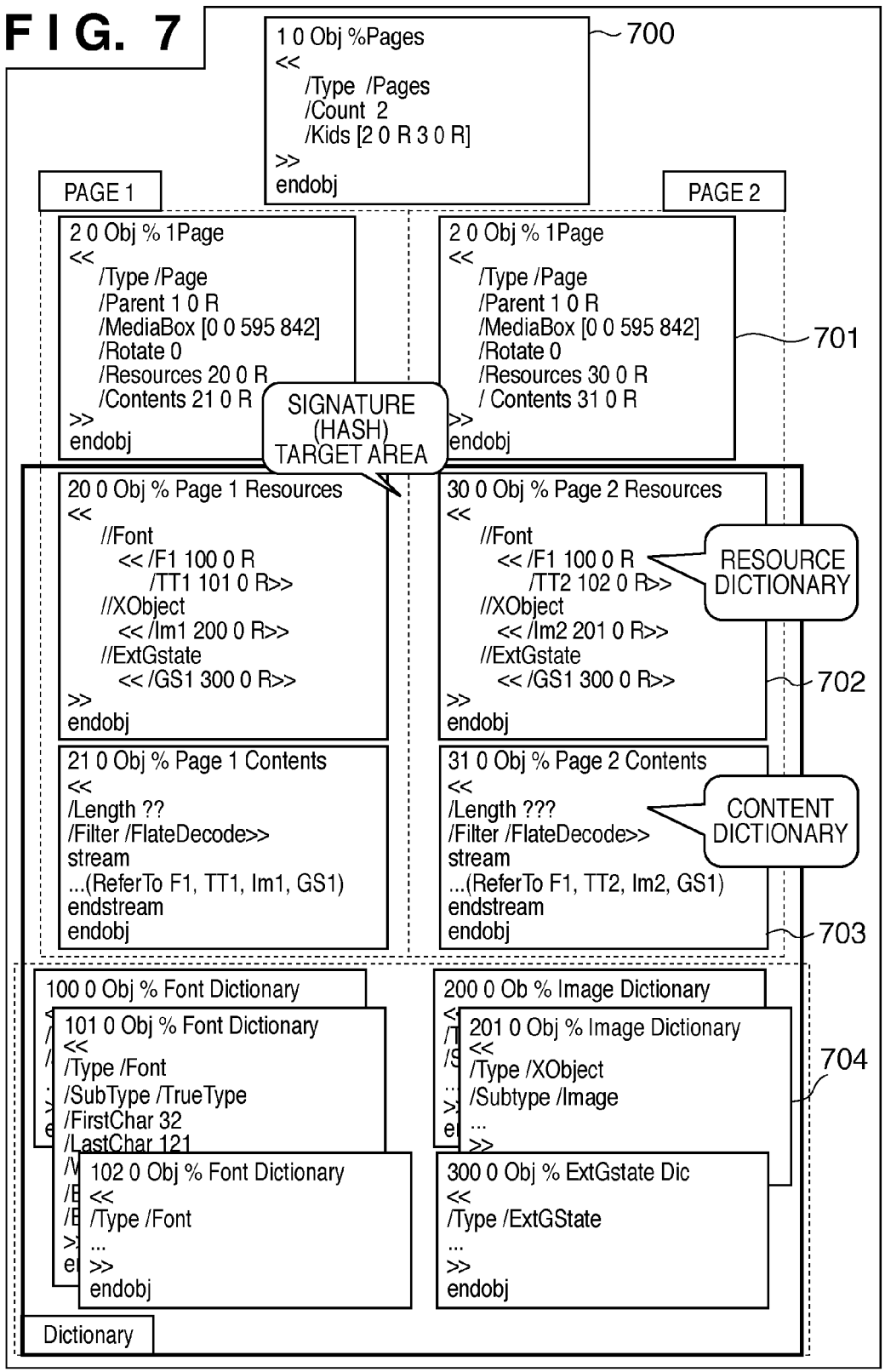
FIG. 7 is a diagram illustrating an example of the data structure of an electronic document (a PDF file) before layout editing.
Figure 8:
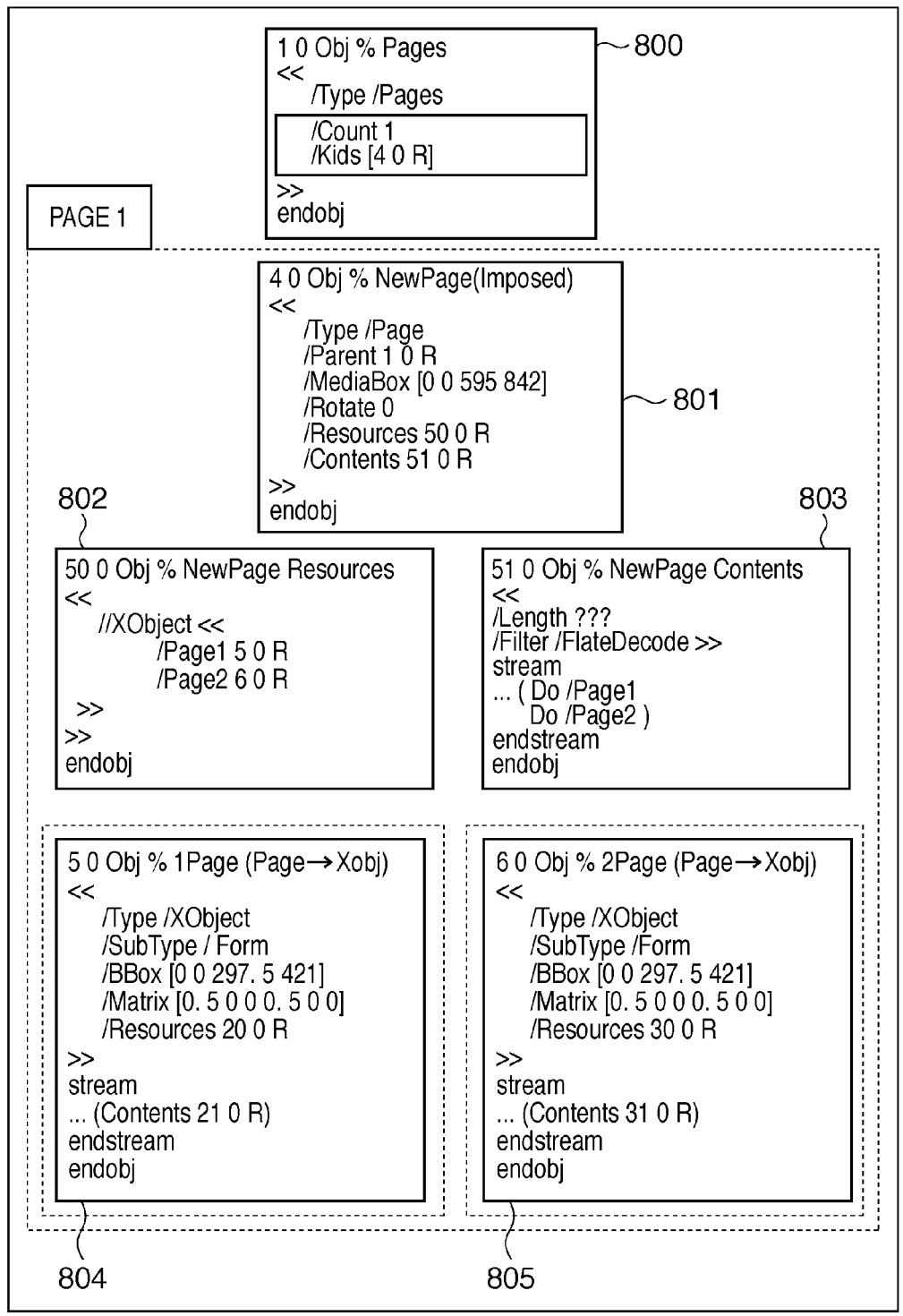
FIG. 8 is a diagram illustrating an example of the data structure of an electronic document (a PDF file) after layout editing.

FIG. 7 is a diagram illustrating an example of the data structure of an electronic document (a PDF file) before layout editing, and FIG. 8 is a diagram illustrating an example of the data structure of an electronic document (a PDF file) after layout editing. Data 700 shown in FIG. 7 is a parent dictionary for managing each of the page dictionaries in the PDF file; it is referred to as the "pages dictionary". The information of pages actually used (displayed) is described in the pages dictionary. In FIG. 7, for example, reference to a page dictionary is described in an array format as the value of "/Kids".

Data 701 indicates a page dictionary and makes reference to content information and a resource dictionary, as described earlier. Data 702 is a resource dictionary to which reference is made from the page dictionary and gathers resource information such as images and fonts. The resource dictionary refers to various resource information. Data 703 is a content dictionary to which reference is made from the page dictionary. Here rendering content actually displayed on the display monitor has been described. The information in the content dictionary makes reference to information such as images and fonts. Data 704 is various dictionaries to which reference is had from a resource dictionary of image and fonts, etc.

The content information described in FIG. 4 contains the resource dictionaries (data 702), content dictionaries (data 703) and various dictionaries (data 704). The portion enclosed by the black frame formed by the bold line in FIG. 7 is the target area of the partial signature.

FIG. 8 is a diagram illustrating an example of the data structure of an electronic document (a PDF file) after layout editing. Data 800 in FIG. 8 is a pages dictionary in the data structure of the electronic document (PDF file) after layout editing. In FIG. 8, data 801 to 805 is inserted into a blank page that has been inserted at step S211 of FIG. 2, and the structure is changed in such a manner that reference is had to a page in which the values of "/Count" and "/Kids" of data 800 have been inserted. The value of "/Kids" shown in data 800 indicates the page dictionary that has been created anew. Further, the page reference information (the value of "Kids" in data 700 of FIG. 7) that existed before layout editing has been detected, as described in conjunction with FIG. 6.

Data 801 is a page dictionary that has been added on anew with execution of layout editing and is referring to the resource dictionary indicated by data 802 and the content data indicated by data 803. The data 802 is referring to data 804 and 805 obtained by putting the content information into object form by "FormXObject". The fact that this layout is "2-in-1" is indicated by the description "Do/Page1 Do/Page2" of data 803.

The items of data 804 and 805 are dictionaries obtained by putting the content information into object form by "FormXObject" before layout editing. The essence of the content dictionaries and resource dictionaries to which reference is made from both exists in each page prior to layout editing and has not changed.

<Method of Verifying Whether Only Layout Editing has been Performed Correctly>

Described next will be processing for verifying whether only layout editing of an electronic document has been performed correctly and that there has been no alteration.

Figure 9:
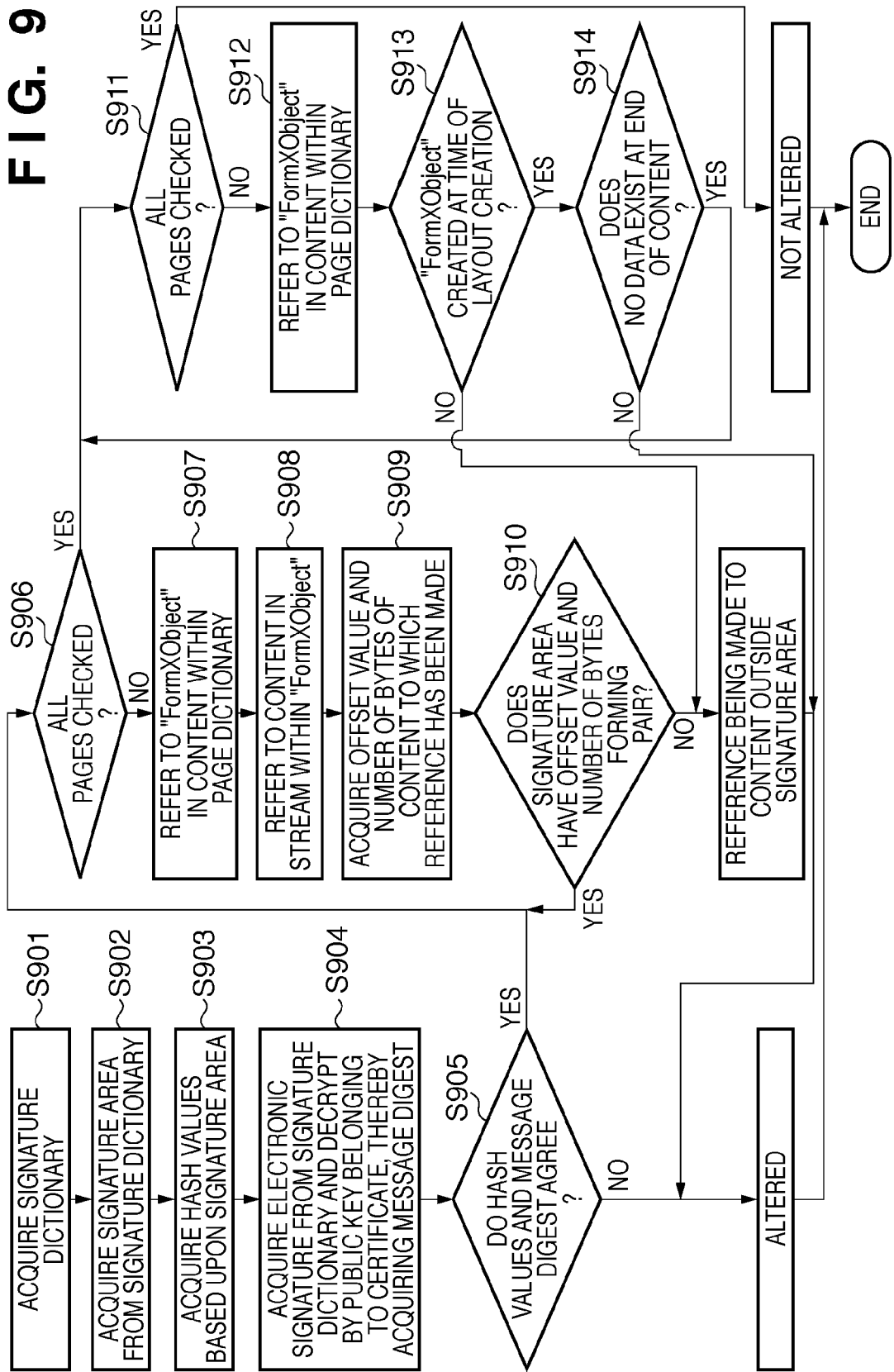
FIG. 9 is a flowchart illustrating processing for verifying whether only layout editing has been performed correctly in this embodiment.

FIG. 9 is a flowchart illustrating processing for verifying whether only layout editing has been performed correctly in this embodiment. The processing shown in FIG. 9 is classified broadly into three portions, namely a portion (first verification) indicated at steps S901 to S905, a portion (second verification) indicated at steps S906 to S910, and a portion (third verification) indicated at steps S911 to S914. The portion indicated at steps S901 to S905 performs partial verification with regard to a portion related to content information. The portion indicated at steps S906 to S910 verifies whether the referential target of a content dictionary of "FormXObject" created as a new page coincides with a content dictionary to which a partial signature has been applied by the preparer. Further, the portion indicated at steps S911 to S914 verifies that a content dictionary of a new page is referring solely to "FormXObject" created as a new page and is not referring to any data other than "FormXObject". FIG. 9 is described with regard to a case where the electronic document is a PDF file. However, in a case where another structured document is used, processing corresponding to the processing of FIG. 9 is executed in such a manner that the objectives of the three types of verification described above can be achieved. In such case the division of processing into three portions need not be in accordance with the flowchart shown in FIG. 9. For example, some of the steps of the third verification may be performed at steps indicated by the second verification.

First, at step S901, a signature dictionary is acquired from the electronic document and then, at step S902, the area that has been signatured (the signature area), i.e., the information that is the pair of offset value and number of bytes, is acquired from the acquired signatured dictionary. At step S903, the hash values are acquired based upon the signature area acquired at step S902. At step S904, the electronic-signature information and the public key, which is contained in the certificate, are acquired. Further, by using the acquired public key, the electronic-signature information is decrypted and a message digest is acquired. The message digest is composed of the hash values included in the electronic-signature information. At step S905, the hash values acquired at step S903 and the message digest acquired at step S904 are compared. If agreement is determined, control proceeds to step S906. If there is no agreement, then it is determined that an alteration has occurred and this processing is exited.

Next, at step S906, it is determined whether the processing of steps S907 to S910 has been executed with respect to all new pages. If it is determined here that the processing has been executed with respect to all pages, control proceeds to step S911. On the other hand, if it is determined that an unprocessed page remains, then control proceeds to step S907.

At step S907, reference is had to "FormXObject" in the content within the page dictionary. Here this "FormXObject" indicates the data 804 or 805 shown in FIG. 8. At step S908, reference is had to the content in the stream information in "FormXObject". For example, this means making reference to the content that has been described in "stream" of data 804 shown in FIG. 8. At step S909, the offset value and number of bytes from the beginning of the file of the electronic document of the content referred to at step S908 are acquired. At step S910, it is determined whether the pair formed by the offset value and number of bytes acquired at step S909 is in the information (i.e., hash range) of the signature area acquired from the signature dictionary. If it is determined that the information has the pair, then it can be construed that content reference in "FormXObject" in this new page has been protected by a signature. This is regarded as indicating that there has been no alteration and control therefore proceeds to step S911. On the other hand, if it is determined that the information does not have the pair, then it can be construed that reference is being made to content that is outside the signature area acquired from the signature dictionary. Accordingly, it is determined that an alteration has been made and this processing is then exited.

Next, at step S911, it is determined whether the processing of steps S912 to S914 has been executed with respect to all new pages. If it is determined here that an unprocessed page still exists, control proceeds to step S912. At step S912, reference is made to "FormXObject" in the content within the page dictionary. At step S913, it is determined whether "FormXObject" in the content within the page dictionary is positively the "FormXObject" that was created at the time the layout was created.

Figure 12:
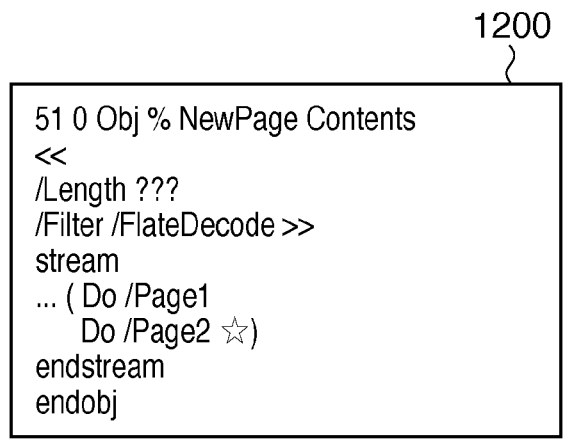
FIG. 12 is a diagram illustrating an example of a content dictionary that has been inserted into a new page.

Reference will now be had to FIG. 12, which is a diagram illustrating an example of a content dictionary 1200 that has been inserted into a new page. As shown in FIG. 12, no reference is being made to "FormXObject" other than that of pages 1 and 2 (e.g., page 3), which is content that has been partially signatured, in "stream" in which rendering information has been described. Accordingly, it is determined positively that "FormXObject" in the content within the page dictionary is the "FormXObject" that was created at the time the layout was created.

If it is determined at step S913 that "FormXObject" in the content within the page dictionary is the "FormXObject" that was created at the time the layout was created, control proceeds to step S914. On the other hand, if it is determined that FormXObject" in the content within the page dictionary is not the "FormXObject" that was created at the time the layout was created, then it is construed that reference is being made to content that is outside the signature area. Accordingly, it is determined that an alteration has been made and this processing is exited.

Next, at step S914, it is determined whether data exists at the end of the content dictionary.

With reference again to FIG. 12, no data whatsoever exists following "Do/Page1/Page2" (the portion indicated by the star symbol) in "stream", as shown in FIG. 12. Accordingly, it is determined that reference other than that to rendering data and partially signatured content does not exist. If it is determined at step S914 that such reference does not exist, control returns to step S911. On the other hand, if reference information such as images and fonts, for example, has been described at the location of the star symbol in FIG. 12, then it is construed that content outside the signature area is being referred to or has been inserted. Accordingly, it is determined that an alteration has been made and this processing is exited. If it is determined at step S911 that the processing of steps S912 to S914 has been executed with respect to all pages, then it is determined that an alteration has not been made as a result of the layout editing performed by the user. This processing is then exited.

Figure 10:
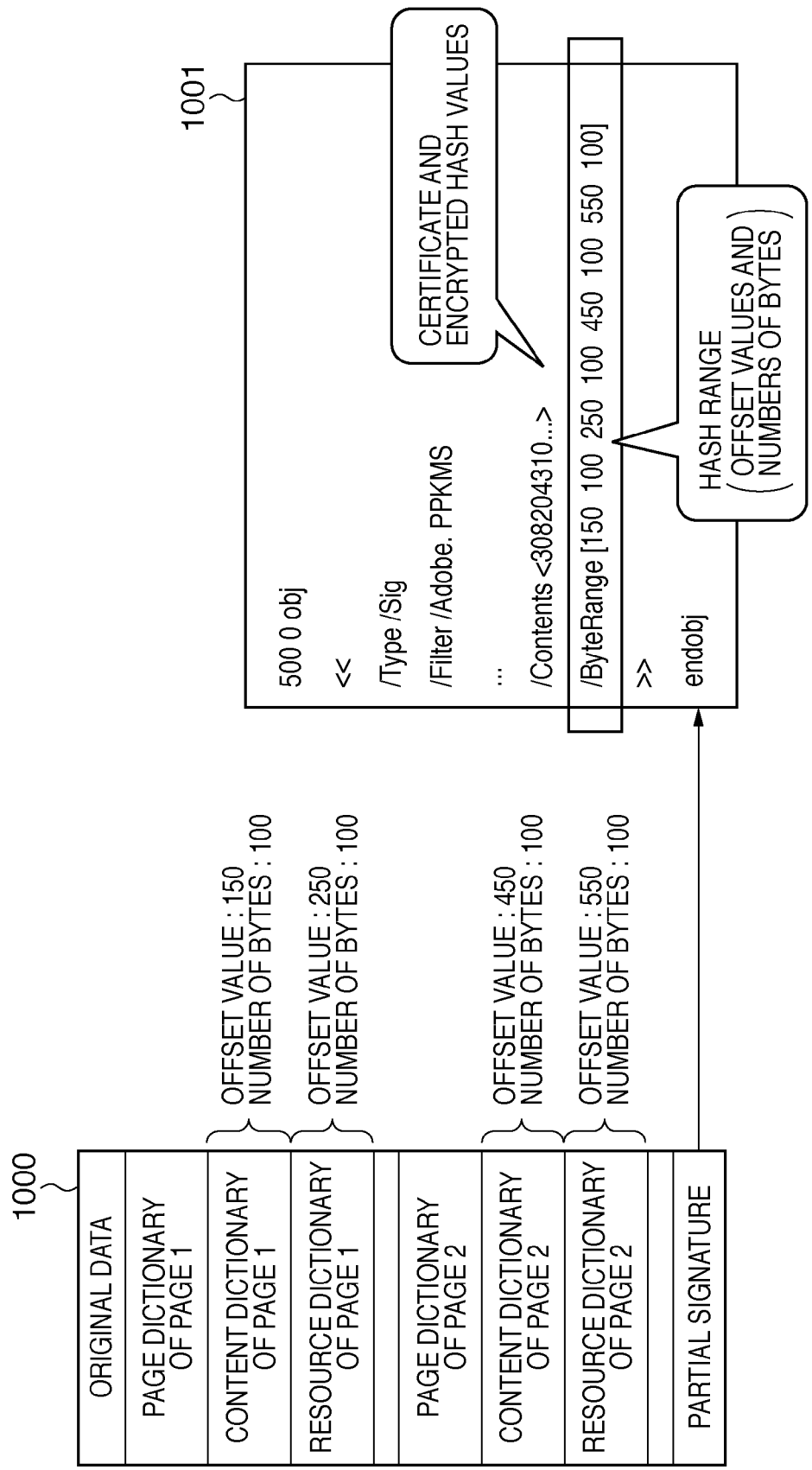
FIG. 10 is a diagram illustrating an example of the data structure of an electronic document in a state in which a partial signature has been applied.

FIG. 10 is a diagram illustrating an example of the data structure of an electronic document in a state in which a partial signature has been applied. As illustrated in FIG. 10, the offset values and numbers of bytes of the content dictionary and resource dictionary of each page in electronic document 1000 have been inserted into the signature dictionary as the hash range. The signature dictionary has been incrementally saved at the end, as already described. Further, in a case where verification of the partial signature indicated at steps S901 to S905 in FIG. 9 is performed, various information included in signature dictionary 1001 shown in FIG. 10 is utilized. "/ByteRange" shown in the signature dictionary 1001 indicates the range over which hash values have been calculated with respect to the content information. The hash range is composed of pairs of offset values and numbers of bytes from the beginning of the electronic document, as illustrated in FIG. 10. Verification of the partial signature is performed using this hash range, the certificate included in "/Contents" and the encrypted hash values.

FIG. 11 is a diagram illustrating an example of a dictionary in which content information has been put into the form of a FormXObject. The dictionary in which content information has been put into the form of FormXObject is used in processing for verifying agreement with the partially signatured content dictionary at steps S906 to S910 shown in FIG. 9. Data 1100 indicates a dictionary in which content information has been put into the form of FormXObject. The offset value and number of bytes of the reference information in "stream" in which the rendering information of data 1100 has been described are acquired. If the acquired pair of values exist in the signature dictionary, it can be construed that the content to which the data 1100 refers has been protected by a signature and therefore it can be determined that no alteration has been made. On the other hand, if the acquired pair of values do not exist in the signature dictionary, then it can be construed that the data 1100 is referring to content that is outside the signature area and therefore it can be determined that an alteration has been made. In FIG. 11, the data 1100 refers to data 1101 and the data 1101 is the partially signatured content dictionary. It can be determined, therefore, that no alteration has been made.

Figure 13:
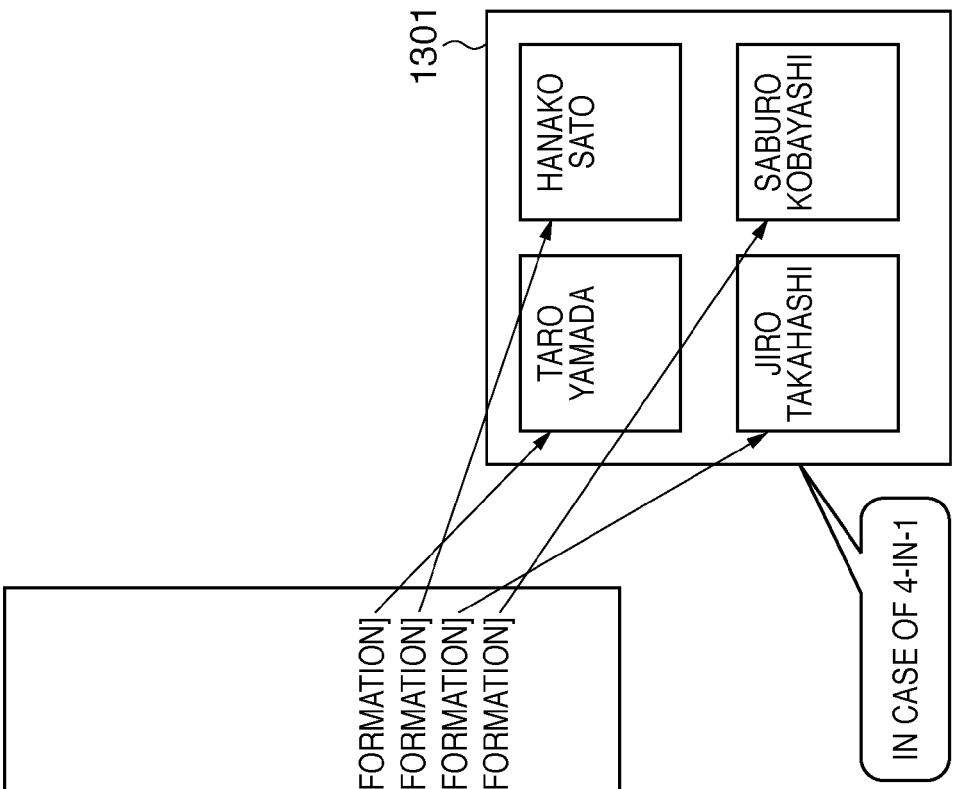
FIG. 13 is a diagram illustrating an example of the data structure of a content dictionary in a case where a user has added on background rendering data in layout editing.

FIG. 13 is a diagram illustrating an example of the data structure of a content dictionary in a case where a user has added on background rendering data in layout editing. In an electronic document control system, the preparer sets a background-rendering possible/not possible policy together with the layout control policy with respect to an electronic document, thereby making it possible to control background rendering. Data 1300 shown in FIG. 13 indicates the content of the content dictionary of a page newly added on for layout editing. The content dictionary is expressed in the PDF format. Here each "FormXObject" puts the content information into the form of an object, as already described.

In a case where an electronic document has been imparted with a layout control policy and a policy that permits background rendering, the electronic document editing application makes background rendering possible by adding the rendering information to the beginning of the stream data, as indicated at data 1300. As a result, a character string is rendered with respect, to the designated position information, as indicated at image 1301. FIG. 13 illustrates a "4-in-1" layout. Here the rendered content (background object) may be an image rather than a character string.

The first to third verifications described in FIG. 9 are carried out also in a case where the user performs background rendering. In the third verification in particular, what is verified is that the content dictionary of a new page is referring solely to "FormXObject" created in a new page and is not referring to any data other than that of "FormXObject" and a background object. Further, even if rendering information is added solely to the beginning of the stream data, as illustrated in the data 1300 of FIG. 13, processing does not change because it is determined at step S914 in FIG. 9 whether data exists at the end of the content dictionary.

In this embodiment, as set forth in this embodiment, in a case where the user has performed layout editing based upon the layout control policy imparted to an electronic document, whether content has been altered or not is determined on the side of the user. As a result, when the fact that only layout editing has been performed correctly is verified, it is unnecessary to query the preparer and obtain approval. Accordingly, since it is unnecessary to obtain approval upon taking into consideration who the preparer is and the environment in which communication with the preparer is performed, convenience on the side of the user can be enhanced. Further, based upon a background-rendering permission policy imparted to an electronic document, rendering content such as variable data can be added to the background without changing the content.

The present invention also includes a case where an operating system or the like running on a computer executes some or all of the actual processing based upon instructions in program code (the code of the electronic document control program), whereby the functions of the above-described embodiment are implemented by this processing. Furthermore, the present invention is applied also with regard to a case where program code read from a storage medium has been written to a memory provided on a function expansion card inserted into the computer or a memory provided in a function expansion unit connected to the computer. In this case, a CPU or the like provided on the function expansion board or function expansion unit performs some or all of the actual processing based upon the instructions in the written program code and the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-114420, filed Apr. 24, 2008, which is hereby incorporated by reference herein in its entirety.

The invention claimed is:

1. An electronic document control apparatus for editing an electronic document, which has been imparted with a policy for permitting page layout editing or for permitting background rendering of a content in addition to page layout editing, and in which a digital signature has been applied to the content, the apparatus comprising a central processing unit comprising:

a first verification unit configured to verify that the content to which the digital signature has been applied has not been altered;

a second verification unit configured to verify that a referential target of a new page generated afresh in editing of the electronic document is a signature area to which a digital signature has been applied;

a third verification unit configured to, if the electronic document has been imparted with a policy for permitting page layout editing, verify that the referential target of a new page generated afresh in editing of the electronic document does not include anything other than the content to which the digital signature has been applied, and if the electronic document has been imparted with a policy for permitting page layout editing and background rendering of the content, verify that the referential target of a new page generated afresh in editing of the electronic document does not include anything other than the content and a background object of the content; and a determination unit configured to determine, based on at least one result of said first, second and third verification units, whether the edited electronic document has been altered, wherein said determination unit determines that the edited electronic document has not been altered if verification is achieved by said first, second and third verification units, and said determination unit determines that the edited electronic document has been altered if verification is not achieved by any one of said first, second and third verification units.

2. The apparatus according to claim 1, further comprising a saving unit for saving the edited electronic document if result of the determination by said determination unit is that the edited electronic document has not been altered, and refraining from saving the edited electronic document if result of the determination by said determination unit is that the edited electronic document has been altered.

3. The apparatus according to claim 1, wherein the background object of the content is a character string or image.

4. The apparatus according to claim 1, wherein the page layout is imposition, page allocation or layout arrangement of the content.

5. An electronic document control method executed in an electronic document control apparatus for editing an electronic document, which has been imparted with a policy for permitting page layout editing or for permitting background rendering of a content in addition to page layout editing, and in which a digital signature has been applied to the content, the method, being performed by a central processing unit, comprising:

a first verification step of verifying that the content to which the digital signature has been applied has not been altered;

a second verification step of verifying that a referential target of a new page generated afresh in editing of the electronic document is a signature area to which a digital signature has been applied;

a third verification step of verifying that the referential target of a new page generated afresh in editing of the electronic document does not include anything other than the content to which the digital signature has been applied if the electronic document has been imparted with a policy for permitting page layout editing, and verifying that the referential target of a new page generated afresh in editing of the electronic document does not include anything other than the content and a background object of the content if the electronic document has been imparted with a policy for permitting page layout editing and background rendering of the content; and a determination step of determining, based on at least one result of said first, second and third verification step, whether the edited electronic document has been altered, wherein said determination step determines that the edited electronic document has not been altered if verification is achieved by said first, second and third verification steps, and said determination step determines that the edited electronic document has been altered if verification is not achieved by any one of said first, second and third verification steps.

6. A non-transitory computer-readable storage medium storing a program for causing a computer to execute the electronic document control method set forth in claim 5.

7. An electronic document control system including a terminal device for creating an electronic document, an electronic document control apparatus for editing a created electronic document, and a server for controlling a policy imparted to the electronic document, said terminal device and said electronic document control apparatus being connected via said server and a network, wherein said terminal device and said server include:

an imparting unit configured to impart the electronic document with a policy for permitting page layout editing or for permitting background rendering of a content in addition to page layout editing; and a signature unit configured to apply a digital signature to content in the electronic document to which the policy has been imparted by said imparting unit; and said electronic document control apparatus comprising a central processing unit comprising:

a first verification unit configured to verify that the content to which the digital signature has been applied has not been altered;

a second verification unit configured to verify that a referential target of a new page generated afresh in editing of the electronic document is a signature area to which a digital signature has been applied;

a third verification unit configured to, if the electronic document has been imparted with a policy for permitting page layout editing, verify that the referential target of a new page generated afresh in editing of the electronic document does not include anything other than the content to which the digital signature has been applied, and if the electronic document has been imparted with a policy for permitting page layout editing and background rendering of the content, verify that the referential target of a new page generated afresh in editing of the electronic document does not include anything other than the content and a background object of the content; and a determination unit configured to determine, based on at least one result of said first, second and third verification units, whether the edited electronic document has been altered, wherein said determination unit determines that the edited electronic document has not been altered if verification is achieved by said first, second and third verification units, and said determination unit determines that the edited electronic document has been altered if verification is not achieved by any one of said first, second and third verification units.

* * * * *